Oct. 8, 1968  B. PEIREZ ET AL  3,404,937
MOTION PICTURE PROJECTION USING OPTICAL AND
MAGNETIC SOUND TRACKS
Filed May 13, 1965  5 Sheets-Sheet 3
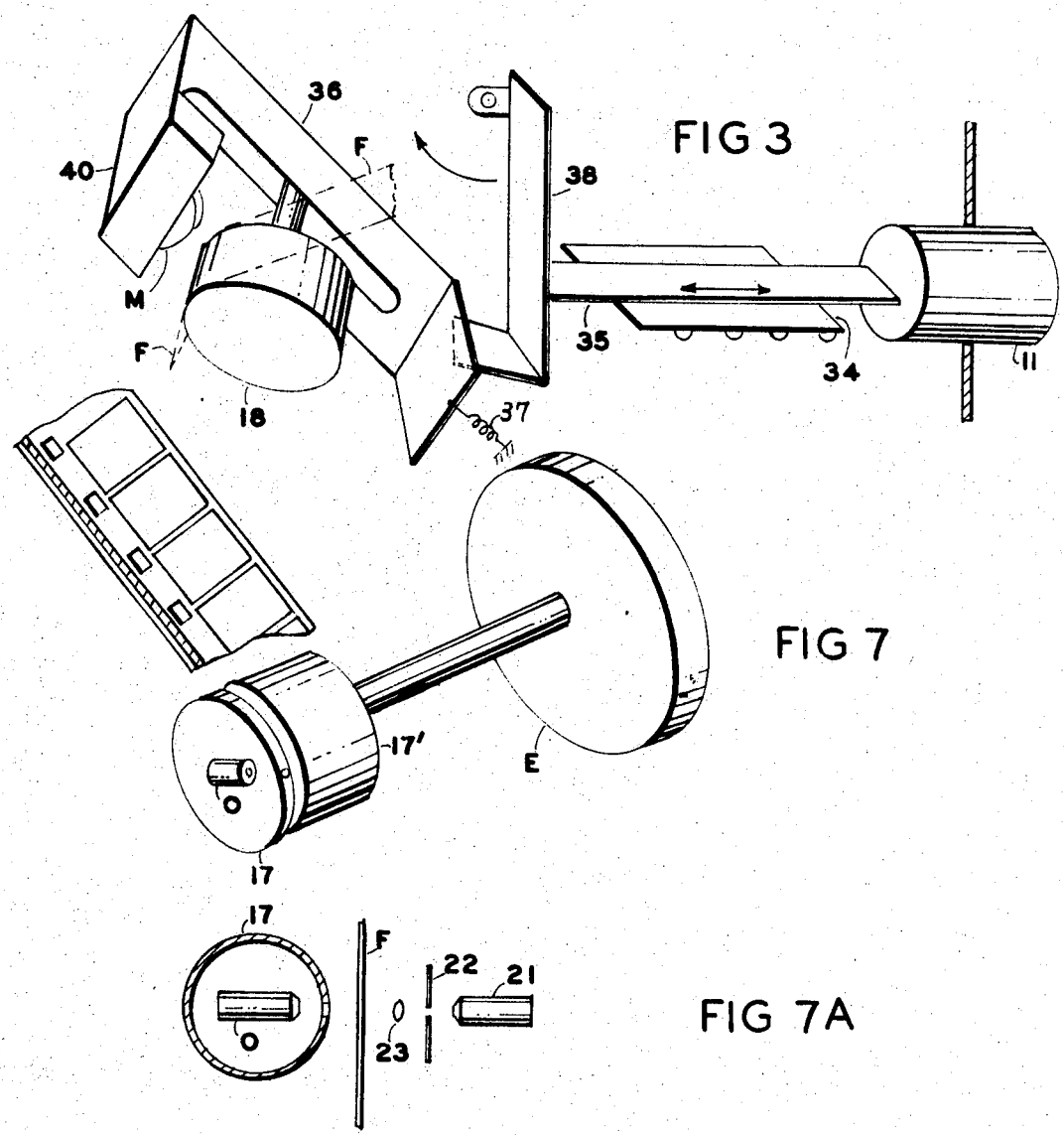
INVENTORS
BEN PEIREZ
MARVIN I. MINDELL
BY James P. Malone

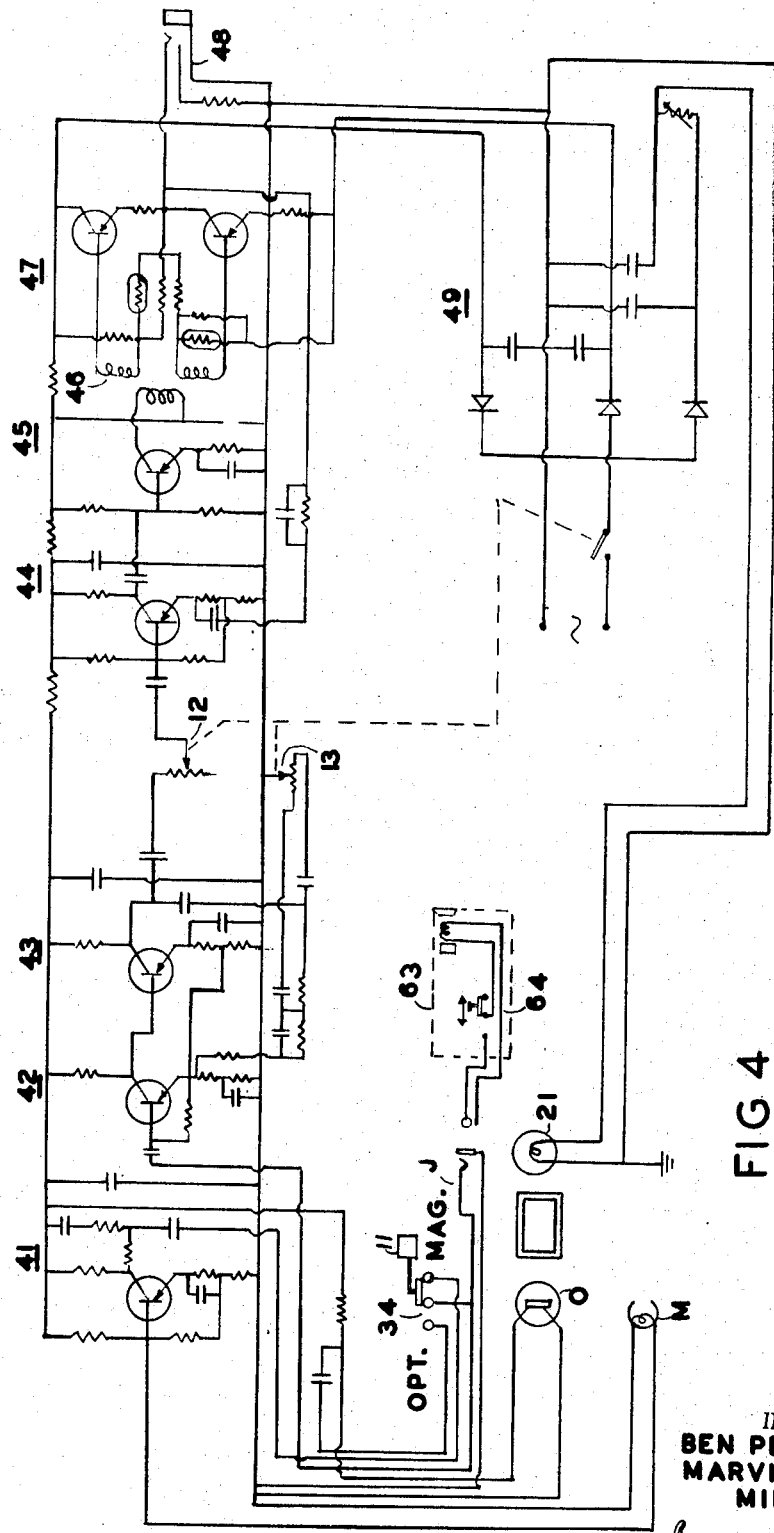

INVENTOR.
BEN PEIREZ
MARVIN I. MINDELL
BY James P. Malone

United States Patent Office 3,404,937
Patented Oct. 8, 1968

3,404,937
MOTION PICTURE PROJECTION USING OPTICAL AND MAGNETIC SOUND TRACKS
Ben Peirez and Marvin I. Mindell, Great Neck, N.Y., assignors to Viewlex, Inc., Holbrook, N.Y.
Filed May 13, 1965, Ser. No. 455,456
3 Claims. (Cl. 352—29)

ABSTRACT OF THE DISCLOSURE

A motion picture projector adapted to use both optical and magnetic sound tracks. Means are provided to accurately gauge the film to measure a predetermined distance from the viewing aperture to the optical and magnetic heads in accordance with the approved film standards Additional switching and matching are provided in the sound amplifier portion to match and accommodate the two different heads. Means are also provided for physically removing the magnetic head from contact with the film when in the optical mode. Means are provided for running the film at different speeds for the different modes of operation.

---

This invention relates to motion picture projectors and more particularly to such projectors which are adapted to use both optical and magnetic sound tracks.

Recently 8 mm. film has been developed using optical sound tracks, and therefore there is a need for motion picture projector means which are adapted to receive both the optical sound track and the magnetic sound track.

The combining of both of these features in one apparatus creates several problems. First, there must be a magnetic head and an optical head. Secondly, there must be means to accurately gauge the film to measure a predetermined distance from the viewing aperture to each of these heads in accordance with the approved film standards. Also, additional switching and matching must be provided in the sound amplifier portion to match and accommodate the two different heads. Means must also provided for physically removing the magnetic head from contact with the film when in the optical mode since the physical contact of the magnetic head might scratch the optical track portion. In addition, means must be provided for running the film at different speeds for the different modes of operation.

The present device is also adapted for viewing 8 mm. silent film. Means are also provided on the projection aperture in order to change the size of that aperture to accommodate the larger picture aperture size that accompanies the optical sound film as well as the standard aperture sizes of the magnetic and silent film.

The 8 millimeter sound projector of the present invention represents a novel development in 8 mm. sound motion picture projection. The projection is capable of showing 8 mm. silent, 8 mm. magnetic sound, 8 mm. optical sound films. The new 8 millimeter optical sound system features larger picture area and high quality sound. Sound on the film is derived from a sound track similar to the sound track which now appears on conventional 16 millimeter and 35 millimeter sound films.

The present invention is designed to be as compact as possible and all components form single compact unit for carrying. Speaker, cable, and accessories may be carried in the cover of the unit which, when separated from the free standing speaker case may be placed beside the screen. The entire projector and amplifier are housed as a single unit.

Accordingly, a principal object of the invention is to provide new and improved motion picture projector means.

Another object of the invention is to provide new and improved motion picture projector means adapted to use both optical and magnetic sound tracks.

Another object of the invention is to provide new and improved film loop setting means adapted to adjust lengths of film between the projecting aperture and the optical and magnetic sound pickups.

Another object of the invention is to provide new and improved sound amplifier means for matching and amplifying the outputs of both the magnetic and optical sound pickups, including means mechanically connected to the switch to move the magnetic pickup out of contact with the film when the switch is in optical position.

Another object of the invention is to provide in combination new and improved means for changing the film speed for different modes of operation.

Another object of the invention is to provide new and improved sound projector means adapted to operate with either optical or magnetic sound film comprising, a projection aperture, an optical sound pickup spaced a predetermined distance from said projection aperture, a magnetic sound pickup spaced a second predetermined distance from said projection aperture and film loop setting means adapted to adjust said film to said first and second predetermined distances.

Another object of the invention is to provide a means for simplified threading of film into the sound reproduction section of the projector.

Another object of the invention is to provide a microphone and a switch mounted within the microphone for oral commentary, supplementing the sound track program on a switch on the microphone or facilitate transferring from film audio program to oral microphone program.

Another object of the invention is to provide new and improved sound picture projector means adapted to operate with either optical or magnetic sound film comprising a projection aperture, an optical sound pickup spaced a predetermined distance from said projection aperture, a magnetic sound pickup spaced a second predetermined distance from said projection aperture, film loop setting means adapted to adjust said projector to said first and second predetermined distances, an amplifier, means to switch said optical or said magnetic pickup to said amplifier, and means mechanically connected to said switch to move said magnetic pickup out of contact with said film when said switch is in optical position.

These and other objects of the invention will be apparent from the following specification and drawings of which:

FIGURE 3 is a perspective view of the mechanical mounting of magnetic head.

FIGURE 4 is a circuit diagram of the sound amplifier.

FIGURES 7 and 7A are detail views of the optical pickup head.

The invention is described in connection with 8 mm. size film but is not limited to any particular size.

The projector comprises several major sections. The first section is the main projector. This is of the conventional 8 millimeter design, except for the sprocket tooth size and the film format size which will be explained later. The lamp may be of the lower voltage internal reflector type eliminating the need for condenser lenses. The projection lens P may also be of the conventional type, but preferably may be converted to a zoom lens with a special screw-on adapter. The film drive and pull down claw mechanism may be of simple conventional design.

The sound section is of novel design and accommodates both optical and magnetic sound films. This section features a unique semi-automatic loading device shown in FIGURES 1 and 2 which greatly simplifies the loading of film.

Located atop the film gate area is a slide lever 54' which changes the film aperture size from conventional 8 mm. to the larger optical sound 8 mm. frame size.

Figure 1:
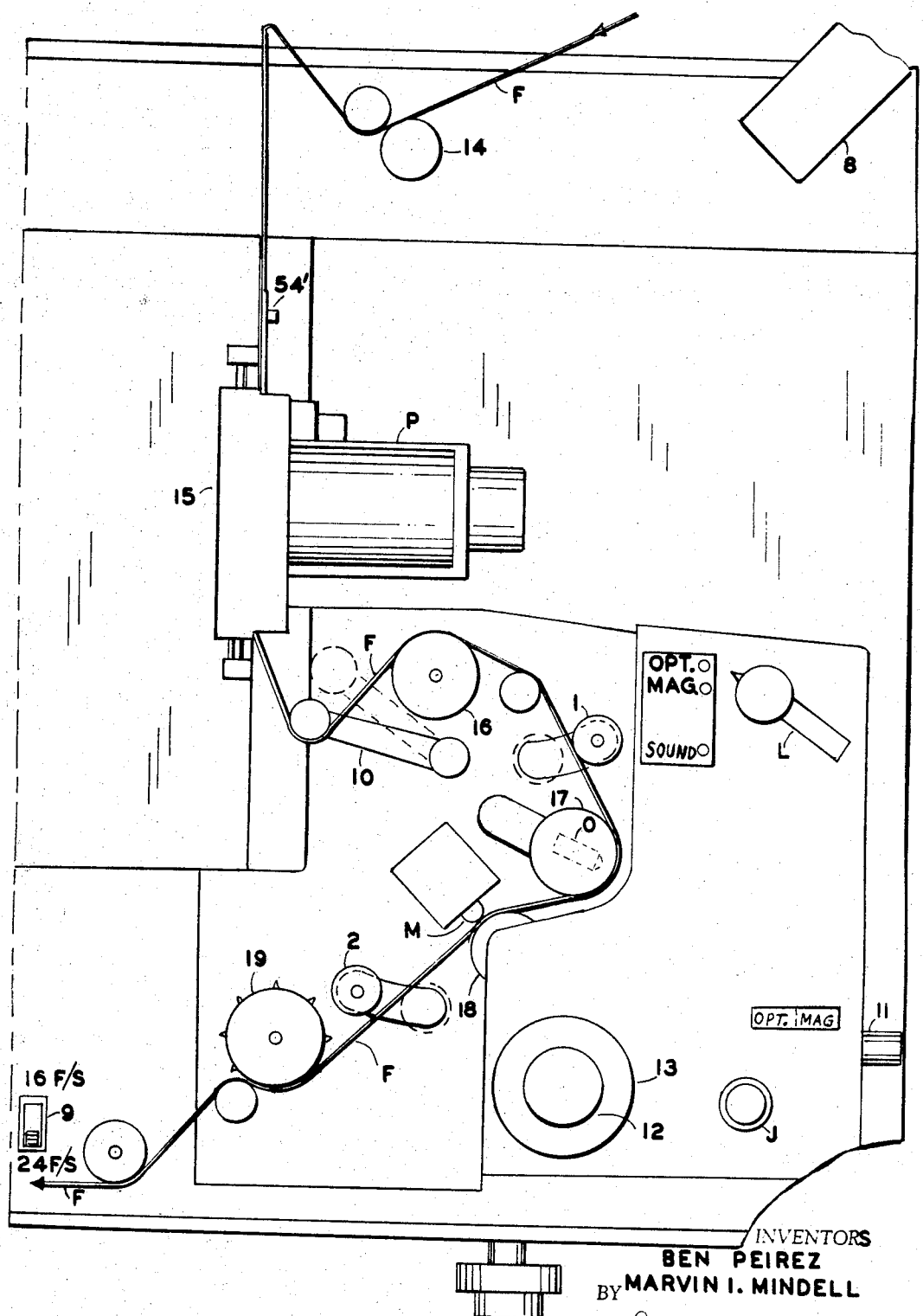
FIGURE 1 is a side view of a portion of the projector.

Referring to FIGURE 1, a speed selector in the form of a slide switch 9 allows for instantaneous switching from 16 frames per second, silent film speed, to 24 frames per second, sound film speed.

A loading lever L facilitates film loading in the sound section. This lever is placed in either optical or magnetic position during loading. This lifts away spring loaded idler rollers 1 and 2 and prevents their interfering with the loading of film F. Additionally, a loop setter 10 automatically positions the lower film loop in order to provide the correct number of frames between the sound pickups and film aperture. This spacing is different for optical and magnetic films, and so this loop setter assumes different dotted line positions corresponding to either the magnetic or optical setting of the loading lever L. In the "project" position the loading lever L releases the two idler rollers 1 and 2 into spring loaded operating position against the film and lifts the loop setter 10 out of the way of the lower loop in film F.

A push button control 11 is provided to switch from magnetic to optical sound. This button appears on the front of the sound section and is an alternate action type. First depression of the button will switch to magnetic projection which connects the magnetic head M to the amplifier and physically lowers the magnetic head onto the film. Pushing the button again lifts the head from the film and connects the optical sound pickup O to the amplifier.

The amplifier is a transistorized type. Volume off-on and tone controls are provided by two coaxial knobs 12 and 13.

To load the projector the film reel is placed on the supply reel on arm 8 and through the first sprocket 14. A snap lock is closed after the film is positioned around each sprocket. The lens mount 15 is swung open and the film is held against the aperture plate, allowing first for a loop after the first sprocket 14. The lens mount is then swung shut. The loading lever L is positioned at the appropriate setting, either "Optical" or "Magnetic." The film is brought around the loop setter 10 and to the sprocket 16. Then the film is brought to the optical sound drum 17 and around to the magnetic sound wheel 18 to the sprocket 19 and along the bottom of the switch assembly to the take up reel, not shown.

The loading lever is then turned to the projection "sound" position gently. This lowers the spring loaded rollers 1 and 2 against the film and pulls away the loop setter 10. If magnetic film is being run the magnetic-optical button 11 is placed in its outer position. If optical film is run it is pressed to its inner position. This button must be pressed again before rewinding after showing magnetic film to lift the magnetic head from the film.

The heart of this projector with respect to its sound capability is the sound section which is the lower right hand part of the projector. A detailed discussion of this section of the projector must start first with the film.

Figure 6:
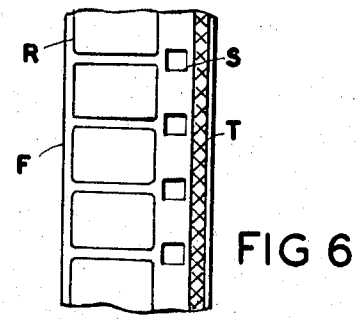
FIGURE 6 is a diagram of a film with sound track.

FIGURE 6 shows the configuration of the 8 mm. sound film per the SMPTE (Society of Motion Picture and Television Engineers)-ASA (American Standards Association) standard for 8 mm. optical and magnetic film. In each case the sound track T is carried on a strip between the sprocket holes and the edge of the film. Since the magnetic track is an adopted standard and has been in use for several years, it will not be discussed in detail other than to remark that the sound track is a layer of iron oxide, the same material used in conventional recording tape, and is recorded in a manner similar to standard tape recording used in the home and industry.

FIGURE 6 shows a diagram of a typical 8 mm. film illustrating the spacing of the frames R, sprocket holes S and the sound track T which is placed between the sprocket holder and the edge of the film. The sound track T may be either a magnetic strip or an optical track.

The conventional optical sound track is a strip on the edge of the film which carries sound information in the form of density or area variations. The frequency of these variations determine the sound frequency and the contrast ratio, for variable density, or the peak to peak distances, for variable area, determine the intensity of loudness of the sound.

Referring to FIGURES 7 and 7A, in the optical mode, during playback the sound is detected off the film by passing a beam of light through the track T and detecting this light with a photocell O. The dimensions of this light beam are fixed at .001+.00000, −.00025 inch by .038±.001 inch. The light originates from a prefocused exciter lamp 21 and then passes through a mask 22 and cylindrical lens 23 which focuses it on the film sound track. A photocell O mounted behind the film detects the light as it is modulated by the sound track. Adjacent to the photocell and supporting the greatest area of film is a stablizer drum 17' which is connected to a heavy fly wheel E. The film is wrapped around this drum to provide as great an arc of contact as possible. The moving film is now in intimate contact with the stabilizer drum causing it to rotate. The rotation of the heavy drum in turn smooths out transient variations in the film motion, dampening all causes of flutter and wow.

For the drum to work effectively, there must be some compliance in the system. Since the film is held fixed between sprockets 19 and 16 the compliance is forced into the film by two spring loaded rollers 1 and 2. In order to make the loading as convenient as possible, these rollers must be held out of the way during loading. Loading lever L incorporates a linkage system to accomplish this.

The SMPTE-ASA standard fixes the magnetic sound 56 frames (±5 frames) before the picture frame and the optical sound information has been fixed at 52 (±.5) frames before the picture. In order to achieve this distance relationship between picture frame and sound information, a loop setter 10 is provided. This in effect, is a guide or gauge which establishes the distance between the picture format area and the sound detectors. When the loading lever L is placed at optical or magnetic the loop setter 10 is moved to a position which corresponds to the given distance between frame and sound detector by a linkage system. As the film is loaded, it is drawn around the loop setter and through the sound section. When the lever L is moved to sound or project position, the loop setter 10 is moved out of the way to eliminate its interferring with the loop while the projector is operating.

Figure 2:
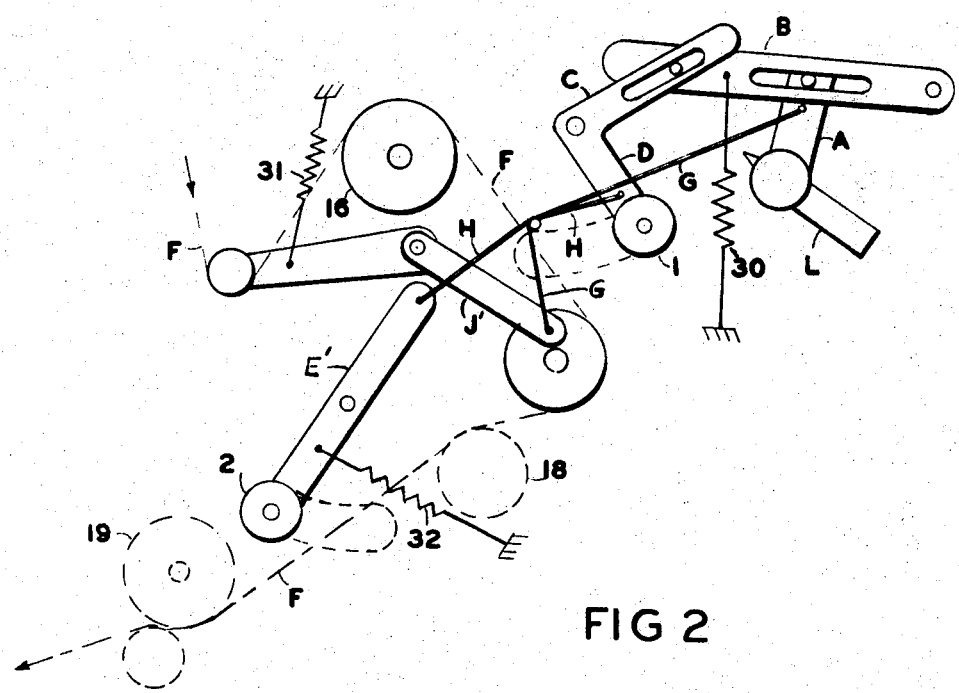
FIGURE 2 is a side view of the same portion of FIGURE 1 with the cover removed.

Referring to FIGURE 2, it shows a view of the projector with the outer cover removed and shows the actual linkage which operates the semi-auto loading feature. FIGURE 2 shows the projector with the load lever in the optical position. Load lever link A is in the extreme CW position, lifting link B, via pin and slot B' which in turn rotates link C which is fixed to link D. Link D is the support for the roller 1 which is now in the extreme right position, viewed from front. In addition, load lever A pulls cord G which rotates link J' and loop setter 10 causing it to rotate CCW viewed from the front. Cord H from link D is pulled rotating link E'CCW. Link E' is the support for roller 2.

In the "Project" or "Sound" position the load lever A is rotated CCW, forcing link B downward rotating links C and DCW which allows roller 1, on link D, to bear against the film F between sprocket 16 and sound head 17. A spring 30 keeps the system forced in this direction. Load lever link A also slackens cord G allowing loop setter 10 to be rotated CCW by the spring 31. Link D slackens cord H which loads link E' and roller 2 against film between the magnetic sound head wheel 18 and sprocket 19. A spring 32 keeps roller 2 bearing against the film. The only difference between magnetic and optical settings of the load lever is the position to which the loop setter link 10 is rotated.

Referring to FIGURE 3, the magnetic optical push button 11 is composed of a latching type electrical push button switch 34 and a mechanical linkage which raises and lowers the magnetic playback head M. When the button initially in "in" or optical position is pressed, it is unlocked and will return "out" or magnetic position. This repositions the contacts on the switch 34 connecting the magnetic head into the amplifier circuit.

Additionally, shaft 35 of the push button and pivotally mounted link 38, allows slide 36 to move under spring 37 tension, lowering magnetic head M onto film F. The magnetic head M support is a leaf spring 40 so that the head will "float" on the film surface, following the film irregularities.

The next time the push button 33 is pressed it will latch in "in" or optical position transfering the amplifier from the magnetic head to the optical photocell detector. The magnetic head will also be lifted off the film by this action of the push button shaft and slide.

Referring to FIGURE 4, the push button switch 34 switches on an extra preamplifier stage 41 into the amplifier with the magnetic head M in order to compensate for the low magnetic head output.

The preamplifier may be a 2SB73 transistor. The remainder of the amplifier comprises amplifier stages 42, 43, 44, and 45 all of which may use a 2SB75 transistor. The amplifier stage 45 is connected by the transformer 46 to a balanced output stage 47 which drives the speaker which is connected to the jack 48. The speaker output stage may comprise a pair of 2SB367 transistors. The power supply 49 is conventional and also provides D.C. power to the light source 21 of the optical head. The volume control 12 and the tone control 13 are also conventional.

Another unique feature is the plug-in microphone 63. The microphone plugs into a miniature jack J on the sound section at the lower right. The microphone features a switch 64 mounted at the side of the microphone case. In one position the switch provides for the normal audio program derived from the film. In the other position the audio program is cut out and the microphone is connected to the amplifier allowing the operator to use the amplifier system of the projector as a "P-A" system. When the microphone is connected in "in" position, the low impedance of the microphone coil effectively shorts out the sound from the film, so that the high microphone output is all that is heard.

Figure 5:
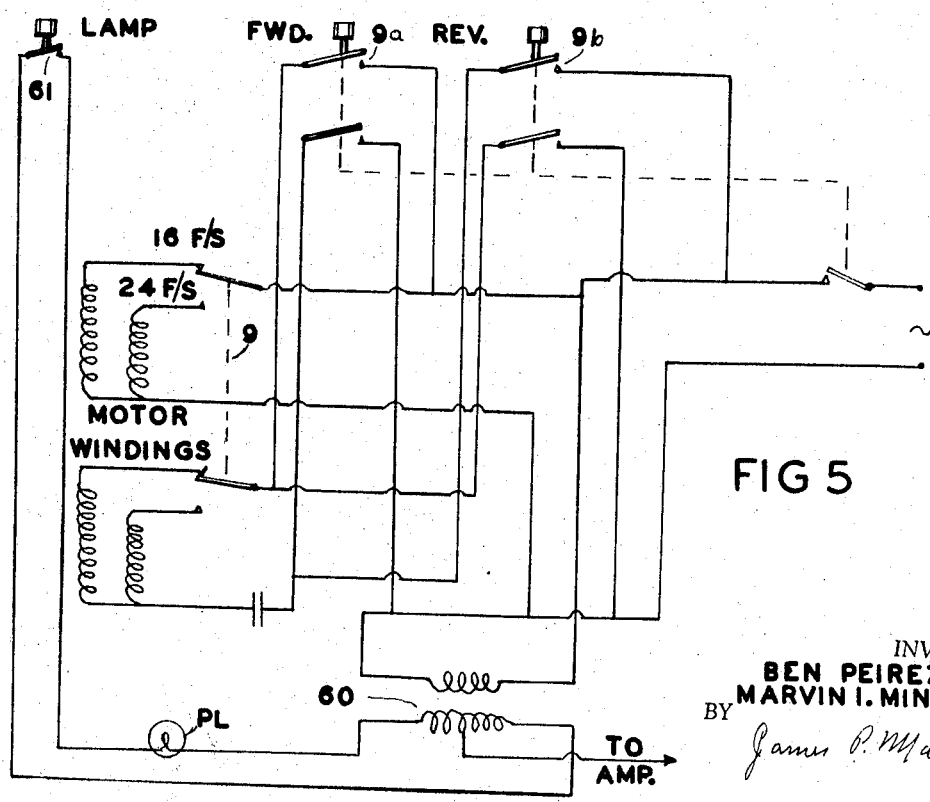
FIGURE 5 is a circuit diagram of the motor speed control for changing the film speed for different modes of operation.

Referring to FIGURE 5, a switch 9 is provided to change the drive motor windings configuration to switch from 24 to 16 frames per second. This provides instantaneous electrical speed change eliminating the need for complicated mechanical devices such as clutches or step cone pulleys. Switch 9a connects the drive motor windings for forward drive and switch 9b connects the drive motor windings for reverse drive. Projector lamp PL is energized from transformer 60 through switch 61.

Figure 8:
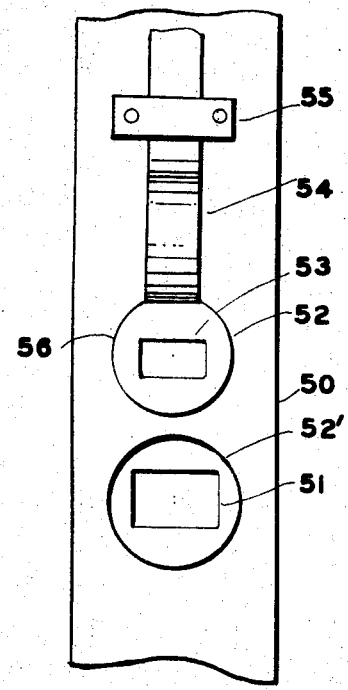
FIGURES 8 and 8A are detail views of the film aperture gate.
Figure 8A:
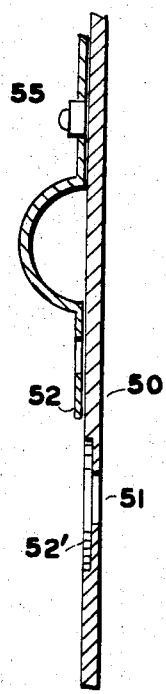

Referring to FIGURES 8 and 8A means are also provided to change the size of the film aperture to show film having smaller size frames. The film guide 50 has a film aperture 51 which is surrounded by a counterbore 52'. In order to provide the smaller size aperture, a mask 52 provides the smaller aperture 53. The mask 52 is mounted on, or is a part of, a sliding spring member 54 which is adapted to slide up and down within the holding guide 55. When it is desired to use the smaller aperture the spring 54 is pushed down until the round mask portion 52 snaps into the counterbore 52' of the guide member 51 thereby providing the smaller aperture. An aperture handle 54', FIGURE 1, is connected to mask spring 54.

Many modifications may be made by those who desire to practice the invention without departing from the scope thereof which is defined by the following claims.

We claim:
1. A sound motion picture projector adapted to operate with either optical or magnetic sound film comprising,
a projection aperture,
an optical sound pickup spaced a predetermined distance from said projection aperture,
a magnetic sound pickup spaced a second predetermined distance from said projection aperture,
film loop setting means adapted to adjust said film to said first and second predetermined distances, said film loop setting means comprising,
a pivotally mounted film loop setting lever,
said lever having a roller thereon adapted to engage a loop in said film,
said loop being located between said projection aperture and said pickups,
an indicating lever having optical and magnetic positions,
and linkage means connecting said loop setting lever and said indicator lever.

2. Apparatus as in claim 1 having a pair of spring loaded tension rollers mounted one on each side of said optical and magnetic pickups, and
linkage means connecting said tension rollers to said indicator lever to move said tension rollers out of the way while threading the film in optical or magnetic position.

3. A sound motion picture projector adapted to operate with either optical or magnetic sound film comprising,
a projection aperture,
an optical sound pickup spaced a predetermined distance from said projection aperture, a magnetic sound pickup spaced a second predetermined distance from said projection aperture,
film loop setting means adapted to adjust said projector to said first and second predetermined distances,
an amplifier,
means to switch said optical or said magnetic pickup to said amplifier.

References Cited
UNITED STATES PATENTS

| | | | |
|---|---|---|---|
| 1,898,173 | 2/1933 | Dina | 352—79 |
| 2,127,143 | 8/1938 | Ross | 352—30 |
| 2,676,023 | 4/1954 | Isom | 352—29 |
| 3,025,750 | 3/1962 | Polan et al. | 352—10 |
| 3,026,634 | 3/1962 | Irazoqui | 352—29 |

JULIA E. COINER, *Primary Examiner.*